UNITED STATES PATENT OFFICE.

MAX WEILER, OF ELBERFELD, GERMANY, ASSIGNOR TO FARBENFABRIKEN VORM. FRIEDR. BAYER & CO., OF ELBERFELD, GERMANY, A CORPORATION OF GERMANY.

DIPHENYLNAPHTHYLMETHANE DYE.

No. 891,888.     Specification of Letters Patent.     Patented June 30, 1908.

Application filed March 13, 1908. Serial No. 420,806.

*To all whom it may concern:*

Be it known that I, MAX WEILER, doctor of philosophy, chemist, a citizen of the German Empire, residing at Elberfeld, Germany, Kingdom of Prussia, have invented new and useful Improvements in Diphenylnaphthylmethane Dyes, of which the following is a specification.

My invention relates to the manufacture and production of new dyestuffs of the diphenylnaphthylmethane series which are obtained by condensing tetraalkylized diaminobenzhydrols with 1-naphthol-3.8-disulfonic acid and oxidizing the leuco-compounds thus obtained. The new dyestuffs are dark powders soluble in water with a bluish color. They dye wool from acid baths from blue to green shades which are remarkable for their excellent fastness to alkalies.

In carrying out my invention I can proceed as follows, the parts being by weight: A mixture of 105 parts of tetramethyl-para-diaminobenzhydrol, 149 parts of 1-naphthol-3.8-disulfonate of sodium and 1200 parts of sulfuric acid (40 per cent.) is heated for about 60 hours on the water bath until the whole hydrol has entered into reaction. The leuco-compound which has almost entirely separated out is then completely precipitated by the addition of an equal volume of water. To produce the coloring matter from this leuco-compound, 40 parts of it are dissolved in 340 parts of water and 8.4 parts of sodium carbonate and then at a temperature of about 65° C., 180 parts of a lead dioxid paste (containing 10 per cent. of $PbO_2$) are added, the solution being well stirred and the stirring is afterwards continued for a quarter of an hour. When the oxidation is finished the lead is precipitated by means of sodium carbonate and the new dyestuff is precipitated in the usual manner by the addition of sulfuric acid and common salt. It is after being dried and pulverized in the shape of its acid sodium salt a dark red powder soluble with difficulty in water with a bluish-green color and soluble in concentrated sulfuric acid with a yellow color. It dyes wool from acid baths greenish-blue shades. The dye from tetraethylhydrol dyes wool bluish-green.

Having now described my invention and in what manner the same is to be performed, I declare that what I claim is:—

1. The herein-described new dyestuffs of the diphenylnaphthylmethane series obtainable by condensing tetraalkylized diaminobenzhydrols with 1-naphthol-3.8-disulfonic acid and oxidizing the leuco-compounds thus obtained, which dyestuffs are after being dried and pulverized dark powders soluble in water with a bluish color and dyeing wool from acid baths from blue to green shades, substantially as described.

2. The herein-described new dyestuff of the diphenylnaphthylmethane series obtainable by condensing tetramethyl-para-diaminobenzhydrol with 1-naphthol-3.8-disulfonic acid and oxidizing the leuco-compound thus obtained, which dyestuff is after being dried and pulverized in the shape of its acid sodium salt a dark red powder soluble with difficulty in water with a bluish-green color, soluble in concentrated sulfuric acid with a yellow color, and dyeing wool from acid baths greenish-blue shades, substantially as described.

In testimony whereof I have hereunto set my hand in the presence of two subscribing witnesses.

MAX WEILER.

Witnesses:
   OTTO KÖNIG,
   WM. WASHINGTON BRUNSWICK.